(12) United States Patent
Sundholm

(10) Patent No.: US 7,231,893 B2
(45) Date of Patent: Jun. 19, 2007

(54) METHOD AND APPARATUS FOR REDUCING COMBUSTION ENGINE EMISSIONS

(75) Inventor: Göran Sundholm, Tuusula (FI)

(73) Assignee: Marioff Corporation Oy, Vantaa (FI)

( * ) Notice: Subject to any disclaimer, the term of this patent is extended or adjusted under 35 U.S.C. 154(b) by 0 days.

(21) Appl. No.: 10/468,702

(22) PCT Filed: Mar. 13, 2002

(86) PCT No.: PCT/FI02/00199

§ 371 (c)(1),
(2), (4) Date: Mar. 18, 2004

(87) PCT Pub. No.: WO02/073013

PCT Pub. Date: Sep. 19, 2002

(65) Prior Publication Data

US 2004/0216699 A1    Nov. 4, 2004

(30) Foreign Application Priority Data

Mar. 14, 2001   (FI) .................................. 20010514

(51) Int. Cl.
*F02B 47/04*   (2006.01)
(52) U.S. Cl. .................................................. 123/25 R
(58) Field of Classification Search ............... 123/25 R, 123/25 J, 25 A, 25 E, 25 G
See application file for complete search history.

(56) References Cited

U.S. PATENT DOCUMENTS

| | | | | |
|---|---|---|---|---|
| 3,930,470 A | * | 1/1976 | Douglas ................... | 123/25 A |
| 4,191,134 A | * | 3/1980 | Goodman ................... | 123/25 J |
| 4,300,485 A | * | 11/1981 | Goodman ..................... | 12/25 J |
| 4,409,931 A | * | 10/1983 | Lindberg .................. | 123/25 R |
| 4,411,224 A | * | 10/1983 | Goodman ................. | 123/25 A |
| 4,442,802 A | * | 4/1984 | Cook et al. ............... | 123/25 L |
| 4,459,943 A | * | 7/1984 | Goodman ................... | 123/25 J |
| 4,958,490 A | | 9/1990 | Harjunpaa | |
| 5,131,229 A | * | 7/1992 | Kriegler et al. ............ | 60/605.2 |
| 5,657,630 A | | 8/1997 | Kjemtrup et al. | |
| 6,082,311 A | * | 7/2000 | Collin ....................... | 123/25 R |
| 6,240,883 B1 | * | 6/2001 | Ahern et al. .............. | 123/25 R |
| 6,415,745 B1 | * | 7/2002 | Hellen et al. ............. | 123/25 R |
| 6,578,532 B1 | * | 6/2003 | Rowley ..................... | 123/25 R |
| 6,732,678 B2 | * | 5/2004 | Lin et al. .................. | 123/25 R |

FOREIGN PATENT DOCUMENTS

DE            42 30 302        3/1994

\* cited by examiner

*Primary Examiner*—Stephen K. Cronin
*Assistant Examiner*—Jason Benton
(74) *Attorney, Agent, or Firm*—Ladas and Parry LLP

(57) ABSTRACT

The invention relates to a method for cleaning exhaust gases from a combustion engine, in which method humid air is fed into the combustion chamber of the combustion engine. In order to reduce nitrogen emissions effectively, particularly when a diesel engine is running at partial power, and in order for the method to be very accurately adjustable to meet the requirements of each particular engine application and use, in accordance with the invention, a mixture of gas and aqueous mist is fed with a spray head (3) into a space (2), which leads to the combustion chamber. The method can be readily implemented by an apparatus, which can be mounted in a small space without having to make substantial changes in the combustion engine. The invention also relates to an apparatus for cleaning exhaust gases from a combustion engine.

31 Claims, 4 Drawing Sheets

METHOD AND APPARATUS FOR REDUCING COMBUSTION ENGINE EMISSIONS

BACKGROUND OF THE INVENTION

The invention relates to a method for cleaning exhaust gases from a combustion engine, in which method humid air is fed into a combustion chamber of the engine, whereby a mixture of gas and aqueous mist is fed with a spray head into a space that leads to the combustion chamber.

The invention also relates to an apparatus for feeding humid air into a combustion engine, the apparatus comprising a spray head for feeding aqueous mist into a space in the combustion engine, gas feeding means for feeding gas into the spray head, liquid feeding means for feeding aqueous liquid into the spray head and mixing means for providing a mixture of gas and aqueous mist from the spray head into said space, which is arranged to be in flow connection with the combustion chamber of the combustion engine and to supply the mixture of gas and aqueous mist into the combustion chamber. This kind of apparatus is known in connection with gas turbine engines, and the purpose of the apparatus is to prevent power and efficiency of the engine from declining when the temperature is high around the turbine, as is the case on hot days.

One aim of environmental protection is to reduce exhaust gas emissions from combustion engines. The present invention provides a solution, by which exhaust gas emissions from diesel engines, in particular, but also from other combustion engines will be reduced.

Exhaust gases from diesel engines contain various harmful combustion products, of which oxides of nitrogen, i.e. $NO_x$, are the most harmful to the environment. The oxides of nitrogen considerably contribute to smog formation, green house effect and soil acidification as well as retard the growth of forests, for instance.

The diesel engines of ships are great polluters of air. According to an American study, published a few years ago, 14% of the nitrogen emissions in the world and 16% of the sulphur emissions originate from marine traffic. Soot/carbon emissions from the diesel engines, which are produced most when the engine runs at a low power level, also pose a problem. Considerable nitrogen emissions are also produced when the engine runs at a low power level. Typically, ship engines are run at a low power level when the ships are in ports, so the emissions are a considerable problem also when the ship is in port.

In diesel engines, nitrogen emissions can be reduced in a known manner by lowering the combustion temperature, whereby emissions are reduced while being produced. The combustion temperature can be lowered in a variety of ways. It can be lowered by injecting water into the combustion chamber or by using an aqueous emulsion in fuel.

According to some studies, injecting water into the combustion chamber may increase smoke emissions. Fuel consumption may also rise, if large amounts of water are injected into the engine. However, other studies show that the so-called HAM (Humid Air Motor) method, in which humid air is fed into the motor, yields good results regarding emissions. In this method the charge air of the diesel engine is humidified by an evaporator and the fuel burns in the engine cylinders in humid air instead of normal air. The HAM method has a drawback that the load capacity of the diesel engine is considerably reduced. A further drawback of the method is that water cannot be dispersed into sufficiently small drops in the evaporator, but the drops produced therein are relatively large, and consequently they do not vaporize quickly and readily. Quick vaporization of the drops is a prerequisite for lowering the emissions and making the engine run smoothly also in other respects.

The use of an aqueous emulsion in fuel reduces nitrogen oxides without that the amounts of carbon dioxides would increase. According to some studies, the obtained results are not so good as those obtained by a method, in which water is injected into the cylinders. However, a problem with the "aqueous emulsion method" is that a sufficient amount of water cannot be mixed with the fuel.

U.S. Pat. Nos. 4,459,943 and 4,411,224 disclose systems for feeding gas and water mist into the intake air of a combustion engine. The amount of gas and water mist are each increased directly proportionally to the load of the engine.

An alternative and also complementary method to air humidification is to remove exhaust gas nitrogen emissions with a catalytic converter. With the catalytic converter the oxides of nitrogen are reduced to nitrogen and water vapour by spraying a mixture of urea and water into the exhaust gases. The catalytic converters reduce nitrogen emissions efficiently but in naval applications they are very expensive: they cost about 30% of the engine price and in large engines even more than that. Moreover, in a ship the catalytic converter takes a lot of space and considerable operating costs are incurred from servicing, etc.

BRIEF DESCRIPTION OF THE INVENTION

The object of the present invention is to provide an economical and effective solution to purify exhaust gas emissions originating from various combustion engines and, in particular, large two- and four-stroke diesel engines. Diesel engines of ships and diesel power stations are thus an important application.

The present invention provides a method for cleaning exhaust gases from a combustion engine, in which method humid air is fed into a combustion chamber of the engine, whereby a mixture of gas and aqueous mist is fed with a spray head into a space that leads to the combustion chamber and in which the mixture of the gas and the aqueous mist is changed according to changes in the load of the combustion engine. Thanks to the gas supply the amount of water to be fed, and the drop size thereof, will reduce as compared with the plain water supply, i.e. water supply at the same feed pressure (as the feed pressure of the gas/aqueous mist mixture) but without feeding the gas. The more gas is fed with respect to the amount of supplied water, the smaller the drops will be. The feeding of gas contributes to providing very small droplets, which vaporize easily and quickly, binding large amounts of energy and lowering the temperature of combustion.

When the method of the invention is applied to a piston engine, and in particular, to a diesel engine, it is recommended that the mixture ratio of the mixture containing gas and aqueous mist is changed such that the amount of the aqueous mist is increased in said mixture as the engine load increases to a given load level, the motor running at partial power, and the amount of gas and aqueous mist is reduced in said mixture as the engine load decreases such that the load being high the absolute amount of water is increased with the load. Thus is obtained a desired drop size that cools the engine optimally as the engine runs at partial power. As the engine load exceeds said given load, it is recommended that the gas supply is substantially discontinued and the liquid supply is continued, whereby the amount of liquid supplied is typically increased as the engine load increases. The reason why it is possible to discontinue the gas supply substantially or completely at high loads is that the temperature of engine charge air is so high at high loads that even relatively large water drops will vaporize easily.

As small droplets vaporize, they bind large amounts of energy. In some applications, the cooling effect may become excessive, which can be prevented by heating the aqueous liquid to be supplied to the spray head by means of the heat in the exhaust gases of the engine, whereby the liquid is fed pre-heated into the engine.

If the method employs washed exhaust gases from the engine as the gas, a higher specific heat is provided for the mixture to be fed into the engine, which further reduces the maximum temperatures of the engine.

Preferred embodiments of the method according to the invention are disclosed in the attached claims.

The major advantages of the method according to the invention include that it enables efficient reduction of nitrogen emissions, in particular, when applied to a diesel engine running at partial power, it can be adjusted very accurately to meet the requirements of any particular engine application and use concerned, and it can be easily mounted in a small space without having to make major changes in the engine. In practice, emissions from ships can be reduced significantly, because in ports and close to land the diesel engines of ships are particularly run at partial power. The method eliminates the use of hazardous, explosive evaporators. This is because a risk of explosion occurs in conditions of high pressure and high temperature combined with a corrosive environment. There will be no need, or at least the need is substantially reduced, to install catalytic converters. In addition, the investment and operating costs of the method are low.

The present invention provides also an apparatus for feeding humid air into a combustion engine, the apparatus comprising a spray head for feeding aqueous mist into a space in the combustion engine, gas feeding means or feeding gas into the spray head, liquid feeding means for feeding aqueous liquid into the spray head and mixing means for providing a mixture of gas and aqueous mist from the spray head into said space, which is arranged to be in flow connection with the combustion chamber of the combustion engine and to supply the mixture of gas and aqueous mist into the combustion chamber wherein the apparatus comprises control means for controlling the feeding amount of the aqueous liquid from the feeding means and control means for controlling the feeding amount of the gas from the feeding means such that the mixture ratio of the gas and the aqueous mist to be fed can be changed according to changes in the engine load.

The gas feeding means advantageously comprises a compressor. Gas feed of the compressor is easy to adjust accurately to meet any particular need.

The liquid feeding means advantageously comprises a pump. The pump is arranged to feed the aqueous liquid at the pressure produced by the gas feeding means. The pump is a piston pump, for instance, whereby the pump pressure automatically sets to the pressure of the gas feed.

In some applications, the aqueous mist may decrease the combustion temperature excessively. In view of this, the apparatus may advantageously comprise a heating means for heating the aqueous liquid to be fed into the spray nozzle, the heating means being advantageously a gas flowing space arranged in the exhaust manifold of the combustion engine, through which manifold a source of the aqueous liquid is arranged to feed the aqueous liquid such that it receives thermal energy of the exhaust gases and heated aqueous liquid can be fed into the spray head. This solution makes use of the thermal energy of the exhaust gases, which would otherwise be wasted.

The preferred embodiments of the apparatus according to the invention are disclosed in the attached claims.

Major advantages of the apparatus according to the invention are that it reduces nitrogen emissions effectively, in particular, when a diesel engine running at partial power is concerned, and in addition, its structure and mounting are simple. The apparatus can be adjusted very accurately to meet the requirements of any particular engine application and use, and it can be readily mounted in a small space without having to make major changes in the engine. In addition, the investment and operating costs of the apparatus are low, and there is no risk of explosion.

BRIEF DESCRIPTION OF THE DRAWINGS

In the following, the invention will be described in greater detail by means of two preferred embodiments, with reference to the attached drawing, wherein.

DETAILED DESCRIPTION OF THE INVENTION

Figure 1:
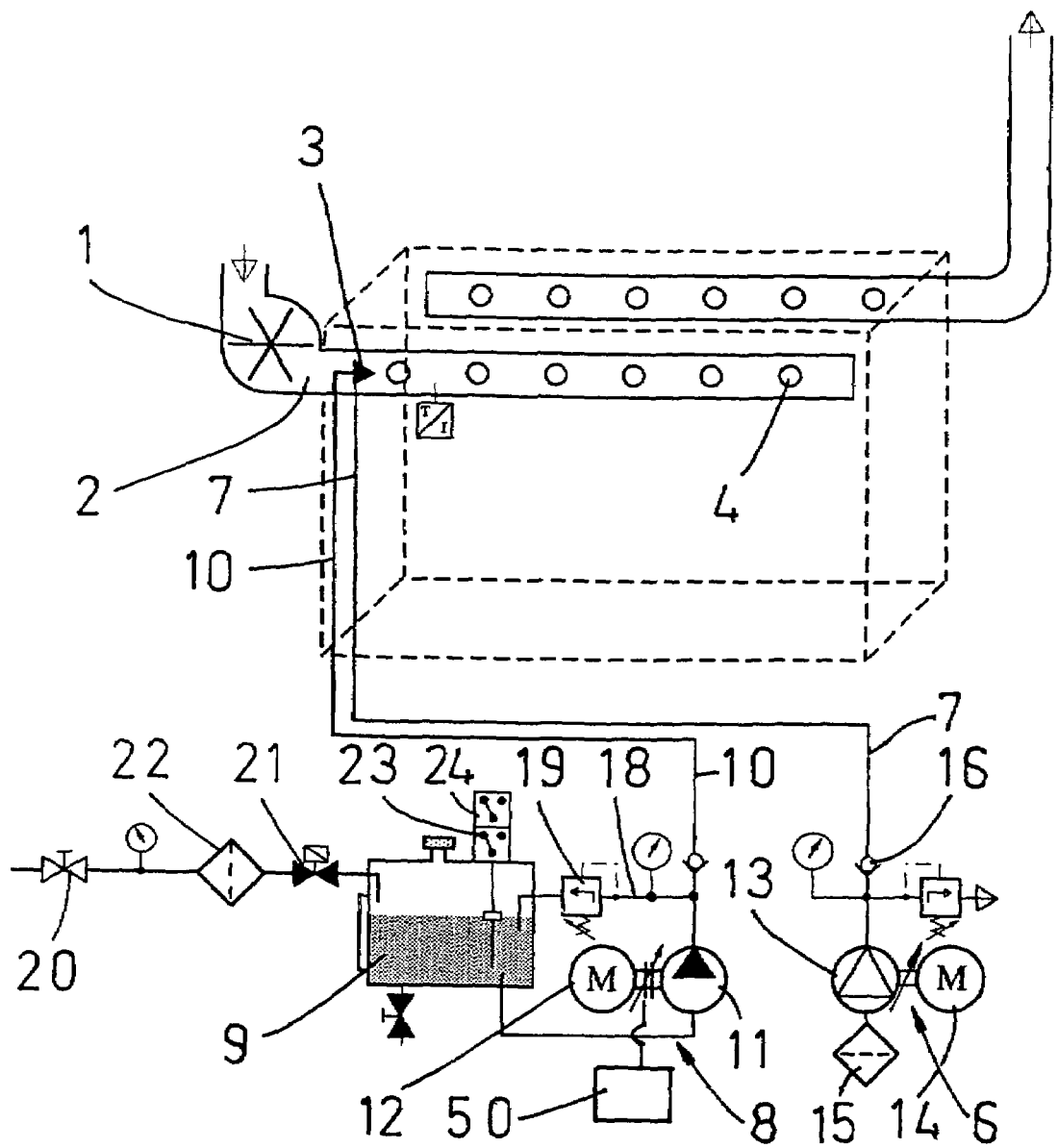
FIG. 1 shows a first embodiment of the invention.

FIG. 1 shows a large 6-cylinder diesel engine of a ship. The engine is provided with a charger 1, which feeds pressurized combustion air into suction pipelines 2. In order to reduce nitrogen emissions from the engine the suction pipelines 2 are provided with a spray head 3, which is arranged to feed a mixture of gas and water mist into the suction manifold, wherefrom said mixture passes into the engine cylinders 4. Because the mixture of gas and aqueous mist enters the cylinders, the combustion temperature in the cylinders 4 decreases. The combustion temperature decreases efficiently both when the engine runs at full power and when it runs at partial power. The reason why the combustion temperature decreases efficiently also when the engine runs at partial power is that the spray head 3 also feeds gas into the suction pipelines. Gas feeding reduces the size of water drops, which is important, so that the water drops would vaporize easily and quickly also when the engine runs at partial power and its temperature is relatively low and the amount of water required for emission reduction is smaller than when the engine runs at full power. Thanks to the lowered combustion temperature nitrogen emissions are reduced efficiently throughout the entire power curve (curve showing power vs. rpm) of the engine. Thus, the gas feed solves the known problem of achieving sufficiently small drops, in particular, when the engine runs at partial power.

Figure 3:
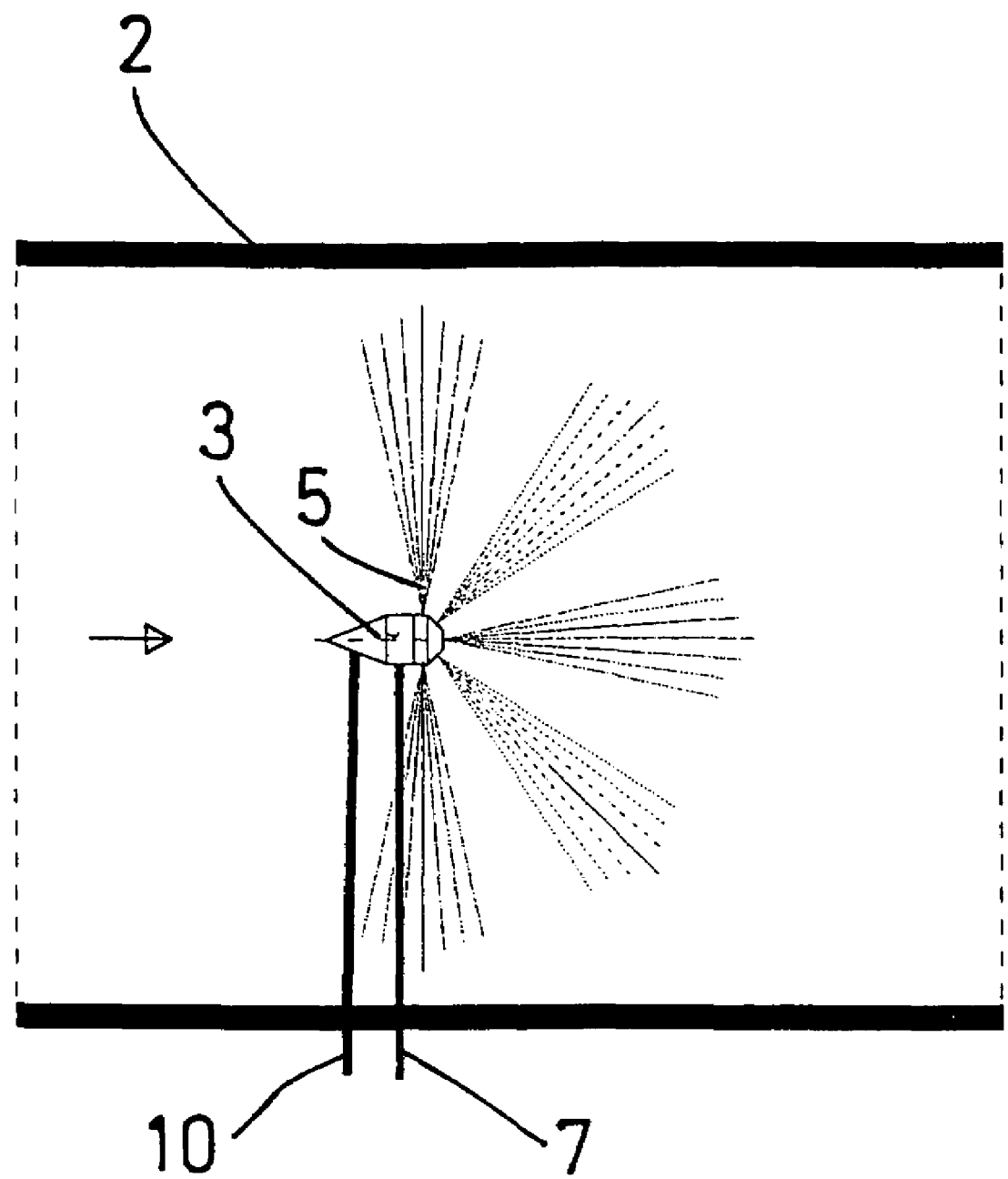
FIG. 3 illustrates an essential component of the invention.

In FIG. 3 the spray head 3 arranged in the suction pipelines 2 is shown enlarged. The spray head 3 comprises a plurality of nozzles 5, which allow an even feed of the mixture of gas and water mist into the suction pipelines 2. The number of nozzles 5 may vary. In principle, one nozzle may be sufficient. The spray head 3 is of the so-called twin liquid spray head type, into which gas and liquid are supplied separately, and the gas and the liquid mix inside the spray head prior to spraying the resulting mixture out through the nozzles 4 as mist.

In the case of FIG. 1, the gas supplied to the spray head 3 is air, and consequently the reference numeral 6 indicates a compressed-air compressor. The air is supplied along a pipe 7 into the spray head 3. The pressure can be 30 bar, for instance. The reference numeral 13 indicates an air pump, the reference numeral 14 indicates an electric motor, the reference numeral 15 indicates a filter and the reference numeral 16 indicates a back-pressure valve, which prevents the medium from being transferred from the pipe 7 into the pump 13.

The liquid to be supplied into the spray head 3 is fresh water or aqueous liquid with a high water content. In practice, the water content is 95 to 100%, in which case values close the upper limits of the range are typically chosen. Advantageously, the liquid may contain anti-corrosive additives or a deliming agent. The fresh water is fed with a pump unit 8 from a container 9 along a pipe 10 to the spray head 3. The pump unit 8 comprises a piston pump 11 and an electric motor 12, whose operating speed can be controlled by control means, which are indicated by the reference numeral 50 in the figure. For instance, the control means 50 can be linked to react to the operating speed of the diesel engine. The reference numeral 17 indicates a back-pressure valve, which prevents the medium from being transferred from the spray head along the pipe 10 into the pump 11 or the container 9. The reference numerals 18 and 19 indicate a pipe and a release valve, respectively, through which the water can flow if the pressure of the pump 11 and in the pipe 18 exceed a given, predetermined limit value. The pipe 18 and the release valve 19 act as safety devices to prevent the pressure from rising so high that a component would get damaged. The reference numerals 20 and 21 indicate valves and the reference numeral 22 indicates a filter. The filter 22 prevents such particles that could block the spray head from entering the spray head 3.

The diesel engine of FIG. 1 operates such that when the diesel engine runs at a low power, both air and water is fed into the spray head 3. Most of the combustion air needed by the engine is fed through a charger 1 into the suction manifold. Air from the compressor 6 and water from the pump 11 mix in the spray head 3 and the spray head nozzles spray the mixture of air and water into the suction pipelines 2. The water is fine-grade mist with a droplet size of 200 micrometers at most, preferably less than 100 micrometers and more preferably less than 50 micrometers. Said drop size values indicate the size of all drops, and not an average size, for instance. The higher the operating speed of the diesel engine, the higher the speed at which the pump unit 8 is driven, whereby the amount of water to be fed into the spray head increases. The pump unit 8 can be controlled in a variety of ways, depending on the control means employed. One method is to make the operating speed of the pump 11 dependent on the operating speed of the diesel engine. The control methods are obvious to the person skilled in the art, and therefore they, or the pump control, will not be described in greater detail herein. The amount of water to be fed into the spray head 3 thus depends on the operating speed of the diesel engine and its momentary power. If the power is high, more water is fed. The amount of water to be fed is roughly 0.5 to 2.5 times the amount of fuel to be fed into the diesel engine. For reducing nitrogen emissions, it is particularly important to feed water when the diesel engine runs at a low power. The amount of air to be fed into the spray head 3 is constant, or it does not change significantly according to the operating speed of the diesel engine when the diesel engine is run at partial power. Because of the above, the water content of the mixture sprayed from the spray head 3 decreases and the water drop size becomes smaller the lower the power by which the diesel engine is loaded.

If the operating speed of the diesel engine exceeds a given, relatively high limit and the diesel engine is run at high power the feeding of air into the spray head 3 is discontinued, or substantially reduced, because even a relatively large drop vaporizes easily, when the engine is run at high power, because the combustion temperature is high.

If desired, the drop size of aqueous mist can be selected so large that the water drops enter up to the cylinders 4, and they will not vaporize until inside the cylinders during the compression stroke. In vaporization, the compression work is reduced and it allows an improved operating efficiency of the diesel engine.

When the water level in the container 9 lowers below a given level, a switch 23 opens a valve 21. A switch 24 closes the valve 21 when the water level in the container 9 has risen to a given level.

Figure 2:
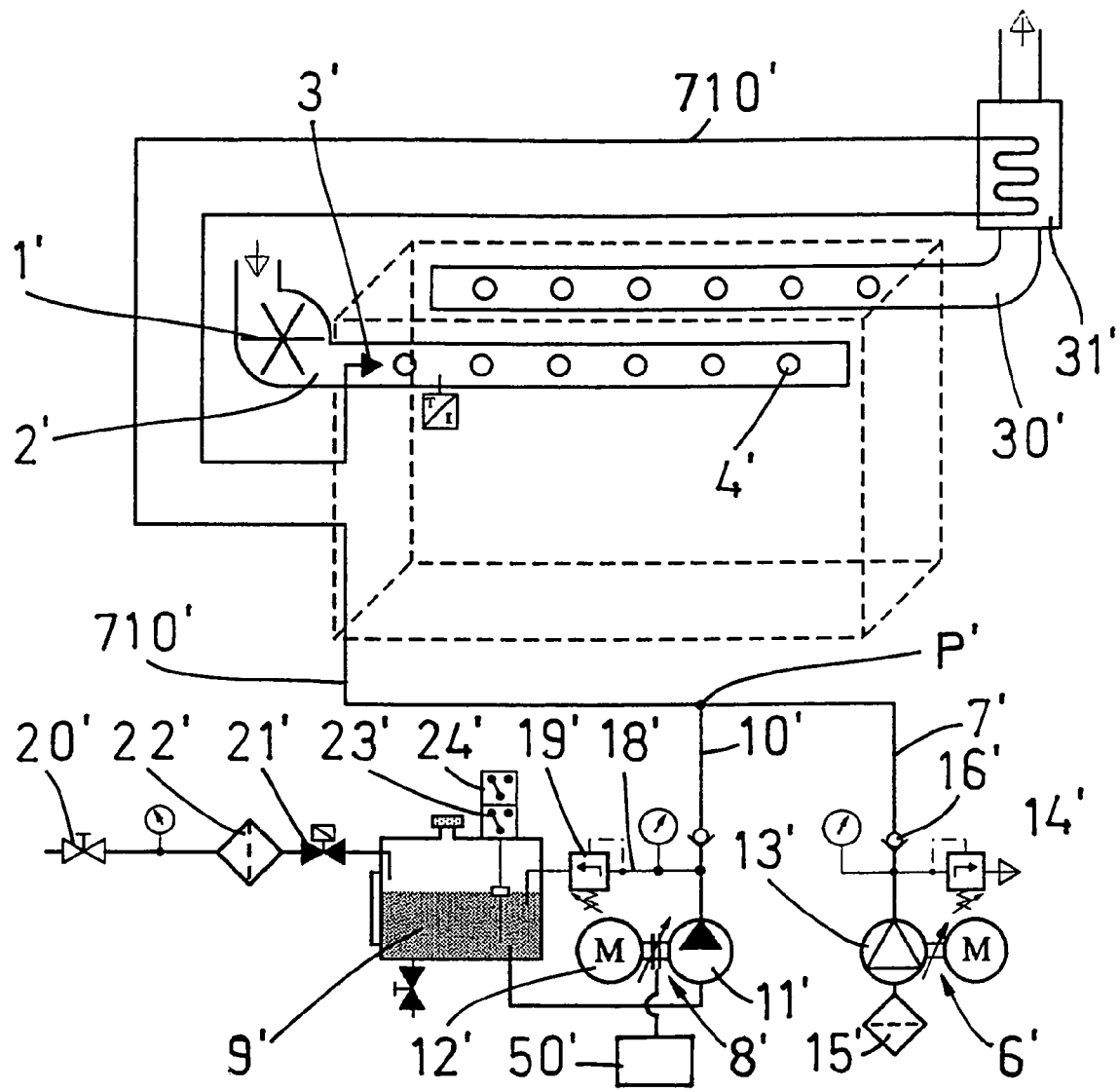
FIG. 2 shows a second embodiment of the invention.

FIG. 2 shows a second embodiment of the apparatus according to the invention installed in the diesel engine. In the embodiment of FIG. 2, like reference numerals refer to like components as in FIG. 1. The solution of FIG. 2 differs from the solution of FIG. 1 such that the medium to be fed into a spray head 3' is heated (preheated). The heating is implemented such that a pipe 710' is arranged in a gas flowing space 31' in the exhaust manifold 30' of the diesel engine, where the hot, flowing exhaust gases release thermal energy to the medium, i.e. air/water mixture, flowing in the pipe 710'. Because the medium in the pipe 710' is preheated, the mixture sprayed from the spray head 3' does not cool the humid air to be fed into the engine excessively. Naturally, the level of preheating is adjusted according to the operating conditions. The gas flowing space 31' may comprise a hot water container, which is arranged to receive heat from the exhaust gases of the combustion engine.

The embodiment of FIG. 2 differs from the embodiment of FIG. 1 also such that the air and the water to be fed into the spray head 3' are mixed prior to feeding into the spray head. Thus, the structure of the spray head 3' can be simpler than that of the spray head 3 in FIG. 1. Mixing mainly takes place at point P', but mixing is still continued in a pipe portion 710 between the point P' and the spray head 3'.

Otherwise the apparatus of FIG. 2 operates as the apparatus of FIG. 1.

Figure 4:
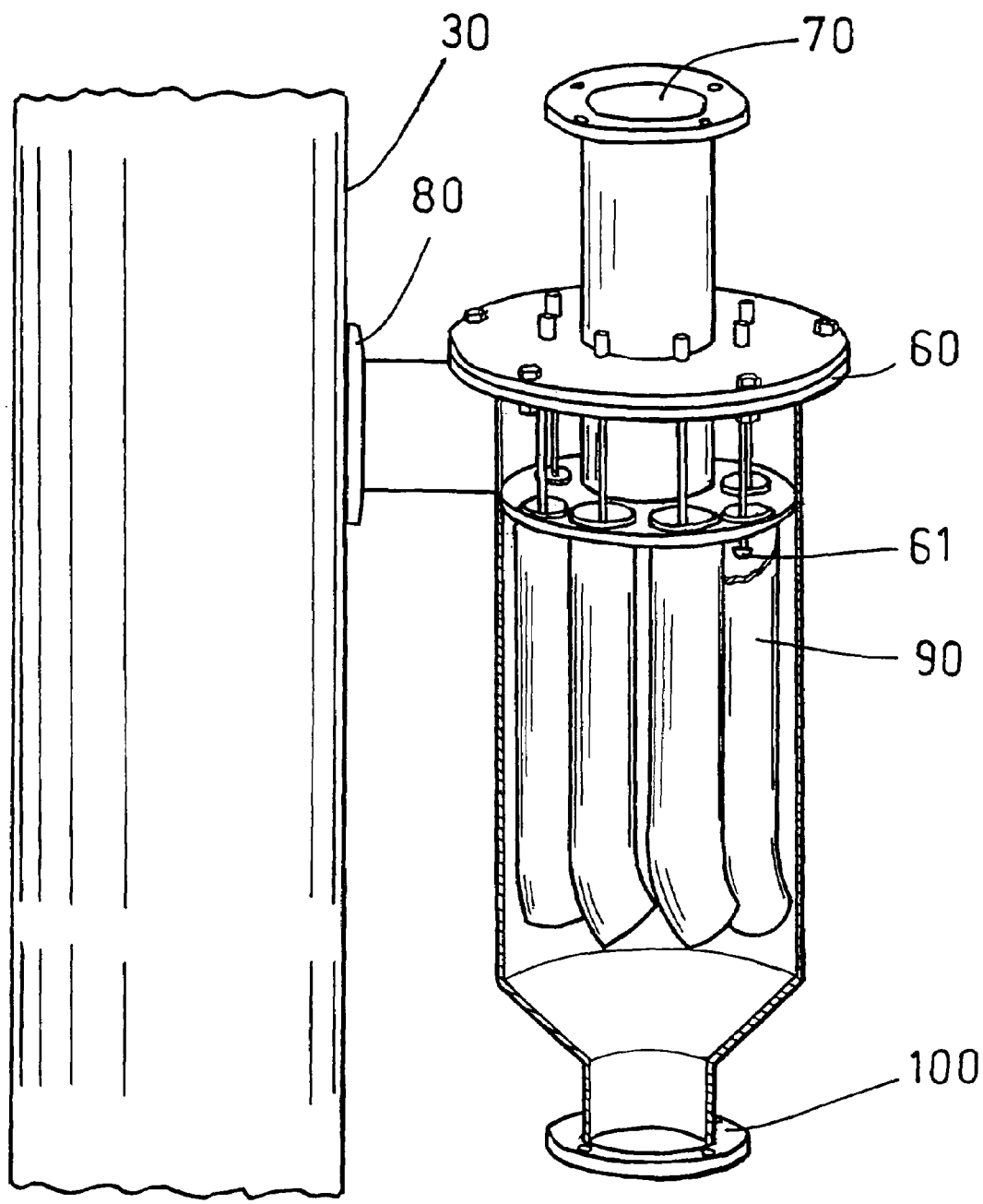
FIG. 4 shows an exhaust gas washing device, which can be applied to the embodiments of FIGS. 1 and 2.

FIG. 4 shows a device for purifying exhaust gases by washing. The device is mounted in exhaust pipelines of the engine according to FIGS. 1 and 2. The reference numerals 61 indicate high-pressure spray heads, mounted in specific pipes 90, supported by a body 60, and spraying aqueous mist, which spray heads are operated at a pressure of 10 to 300 bar, preferably 20 to 100 bar. As the nozzles of the spray heads 61 operate, they generate a suction that sucks exhaust gases. The aqueous mist and the nitrogen oxides from the exhaust gases react to produce nitric acid in the pipelines 90, which constitute reaction chambers. The purified, i.e. washed, exhaust gases exit from the pipe 70, from which they are conducted through a pipe (not shown) to the nozzle 3 and 3' (see FIGS. 1 and 2). The reaction products of the water mist and exhaust gases are discharged from a flange 100, from which the reaction products can be conducted away along a pipe (not shown). The device of FIG. 4 is intended for mounting on a side of the exhaust manifold 30, 30' by means of a flange 80. Alternatively, the flange 80 can be omitted, and then the device is arranged inside the exhaust manifold so that the exhaust gases flow through the device. Upstream of the flange 80 there can preferably be a baffle (not shown) which enables to adjust the ratio of how much of the exhaust gases are led into the flange 80 and how much are allowed to pass in the manifold 30. Washed exhaust gases flowing upwards in pipe 70 can through a pipe (not shown) be led back to the manifold 30 upstream of the flange 80 (and the baffle if such exists). Thanks to removing nitrogen oxides from the exhaust gases, the combination of the washing device of FIG. 4 with the apparatus of FIGS. 1 and 2 results in a system by which the emissions, in particular, nitrogen oxide emissions are rendered very low. The apparatus of FIG. 4 also reduces sulphur emissions substantially.

The invention is described in the above only by means of two examples, and therefore it should be noted that the invention can be implemented in a variety of ways within the scope of the attached claims. Hence, the gas to be supplied into the spray head need not be air but it can be any other gas, for instance, washed exhaust gases originating from the engine. In the latter case, the temperature peaks of the engine will be lowered, because the specific heat of flue gases is higher than that of air, whereby the specific heat of the gas mixture fed from the spray head is higher. The number of nozzles in the spray head and the mutual angles and distances of the nozzles may vary from what is shown in FIG. 3. In principle, there may be several spray heads 3, but it can be assumed that the invention will be most successfully implemented with one single spray head.

The method and apparatus can also be applied to other engines than diesel engines: the method can thus be applied to Otto-cycle engines and gas turbines.

The invention claimed is:

1. In a method for cleaning exhaust gases from a combustion engine, the improvements comprising feeding a mixture of gas and an amount of aqueous mist from a spray head (3, 3') into a space (2, 2') that leads to a combustion chamber of the combustion engine, wherein a mixture ratio of to gas and the aqueous mist is changed according to changes in load of the combustion engine such that the amount of the aqueous mist is increased in the mixture ratio as the engine load increases to a given level of the load with the combustion engine running at partial power, and the amount of the aqueous mist is reduced in the mixture ratio as the engine load decreases such that an absolute amount of water is increased with the load.

2. In a method for cleaning exhaust gases from a combustion engine, the improvements comprising feeding a mixture of gas and an amount of aqueous mist from a spray head (3, 3') into a space (2, 2') that leads to a combustion chamber of the combustion engine, wherein the mixture ratio of the gas and the aqueous mist is changed according to changes in load of the combustion engine, wherein the mixture ratio is changed such that the amount of the aqueous mist is increased in the mixture as the engine load increases to a given level of the load with the combustion engine running at partial power, and the amount of the aqueous mist is reduced in said mixture as the engine load decreases such that an absolute amount of water is increased with the load, and wherein the gas feed is substantially discontinued and the aqueous mist feed is continued so as to provide the aqueous mist from the spay head (3, 3') as the engine load exceeds the given load level.

3. A method as claimed in claim 1, wherein aqueous liquid and the gas are mixed into another mixture, which is supplied to the spray head (3) so as to obtain the mixture of gas and aqueous mist.

4. A method as claimed in claim 1, aqueous liquid and the gas are supplied to the spray head (3'), in which the gas and the liquid are mixed so as to obtain the mixture of gas and aqueous mist.

5. A method as claimed in claim 3, wherein the gas is air.

6. A method as claimed in claim 5, wherein the air is fed with a compressor (6, 6') and that the aqueous liquid is fed with a pinup (11, 11') into the spray head (3, 3').

7. In a method for cleaning exhaust gases from a combustion engine, the improvements comprising feeding a mixture of gas and an amount of aqueous mist from a spray head (3, 3') into a space (2, 2') that leads to a combustion chamber of the combustion engine, wherein the mixture ratio of the gas and the aqueous mist is changed according to changes in load of the combustion engine, wherein aqueous liquid and the gas are mixed into another mixture, which is supplied to the spray head (3) so as to obtain the mixture of gas and aqueous mist, and wherein exhaust gases from the combustion engine, which are washed prior to feeding into the spray head (3, 3') are used as the gas.

8. A method as claimed in claim 7, wherein the aqueous mist is sprayed into the exhaust gases for washing the exhaust gases.

9. A method as claimed in claim 8, wherein the aqueous mist is sprayed at a pressure of 10 to 300 bar.

10. A method for cleaning exhaust gases from a combustion engine, the improvements comprising feeding mixture of gas and an amount of aqueous mist from a spray head (3, 3') into a apace (2, 2') that leads to a combustion chamber of the combustion engine where a mixture ratio of the gas and the aqueous mist is changed according to changes in load of the combustion engine, wherein aqueous liquid is fed into the spray head (3, 3') and heated by heat of engine exhaust gasses prior to the feeding of the mist into the space (2, 2') in the engine.

11. A method as claimed in claim 1, wherein drop size of the aqueous mist is 200 micrometers at most.

12. A method as claimed in claim 1 for cleaning the exhaust gases of a piston engine, a drop size of the aqueous mist being so large that some of the drops enter as such into the combustion chamber and vaporize therein during a compression stroke.

13. An apparatus for feeding humid air into a combustion engine, the apparatus comprising a spray head (3, 3') for feeding aqueous mist into a space (2, 2') in the combustion engine, gas feeding means (6, 6') for feeding gas into the spray head (3, 3'), liquid feeding means (8, 8') for feeding aqueous liquid into the spray head, mixing means (P') for providing a mixture of gas and aqueous mist from the spray head into said space (2, 2'), which is arranged to be in flow connection with the combustion chamber of the combustion engine and to supply the mixture of gas and aqueous mist into the combustion chamber, control means (60) for controlling the feeding amount of the aqueous liquid from the feeding means (8, 8') and control means for controlling the feeding amount of the gas from the feeding means (6, 6') such that a mixture ratio of the gas and the aqueous mist to be fed can be changed according to changes in engine load, wherein the mixture ration of the gas and the aqueous mist is changed much that the amount of the aqueous mist is increased in the mixture ratio as the engine load increases to a given level with the combustion engine running at a partial power, and the amount of the aqueous mist is reduced in the mixture ratio as the engine load decreases such that an absolute amount of water is increased with the load.

14. An apparatus as claimed in claim 13, wherein the gas feeding means comprise a compressor (6, 6').

15. An apparatus for feeding humid air into a combustion engine, the apparatus comprising
a spray head (3, 3') for feeding aqueous mist into a space (2, 2') in the combustion engine,
gas feeding means (6, 6') for feeding gas into the spray head (3, 3'),
liquid feeding means (8, 8') for feeding aqueous liquid into the spray head,
mixing means (P') for providing a mixture of gas and aqueous mist from the spray head into said space (2, 2'), which is arranged to be in flow connection with the combustion chamber of the combustion engine and to supply the mixture of gas and aqueous mist into the combustion chamber,
control means (60) for controlling the feeding amount of the aqueous liquid from the feeding means (8, 8'),
control means for controlling the feeding amount of the gas from the feeding means (6, 6') such that the mixture ratio of the gas and the aqueous mist to be fed can be changed according to changes in the engine load, and
a high-pressure spray head (61) for spraying aqueous mist into the exhaust gases from the combustion engine so as to wash them, wherein the gas feeding means comprise means (70) for conducting the washed exhaust gases into the spray bead (3, 3').

16. An apparatus as claimed in claim 13, wherein the liquid feeding means comprise a liquid source (9, 9') and a pump (11, 11') for feeding the liquid from the liquid source into the spray head (3, 3').

17. An apparatus as claimed in claim 16, wherein the pump (11, 11') comprises control means (50, 50') for increasing the pump rotation rate when the rotation rate of the combustion engine increases and for decreasing the pump rotation rate when the rotation rate of the combustion engine decreases.

18. An apparatus for feeding humid air into a combustion engine, the apparatus comprising
a spray head (3, 3') for feeding aqueous mist into a space (2, 2') in the combustion engine,
gas feeding means (6, 6') for feeding gas into the spray head (3, 3'),
liquid feeding means (8, 8') for feeding aqueous liquid into the spray head, mixing means (P') for providing a mixture of gas and aqueous mist from the spray head into said space (2, 2'), which is arranged to be in flow connection with the combustion chamber of the combustion engine and to supply the mixture of gas and aqueous mist into the combustion chamber,
control means (60) for controlling the feeding amount of the aqueous liquid from the feeding means (8, 8'),
control means for controlling the feeding amount of the gas from the feeding means (6, 6') such that the mixture ratio of the gas and the aqueous mist to be fed can be changed according to changes in the engine load, and
heating means (31') for heating the aqueous liquid to be fed into the spray head (3').

19. An apparatus as claimed in claim 18, wherein the heating means is a gas flow space (31') arranged in the exhaust manifold (30') of the combustion engine, through which gas flow space the source (9') of the aqueous liquid is arranged to feed the aqueous liquid into the spray head (3') such that the aqueous liquid receives thermal energy from the exhaust gases prior to being fed into the spray head (3').

20. An apparatus as claimed in claim 13, wherein the mixing means are located in the spray head (3).

21. An apparatus as claimed in claim 13, wherein the mixing means (P') are upstream of the spray head (3') seen in the flow direction of the aqueous liquid.

22. In a method for cleaning exhaust gases from a combustion engine, the improvements comprising feeding a mixture of gas and an amount of aqueous mist from a spray head (3, 3') into a space (2, 2') that leads to a combustion chamber of the combustion engine, wherein the mixture ratio of the gas and the aqueous mist is changed according to changes in load of the combustion engine,
wherein the mixture ratio is changed such that the amount of the aqueous mist is increased in the mixture as the engine load increases to a given level of the load with the combustion engine running at partial power, and the amount of the aqueous mist is reduced in said mixture as the engine load decreases such that an absolute amount of water is increased with the load, and
wherein aqueous liquid is fed into the spray head (3, 3') and heated by heat in the engine exhaust gasses prior to feeding the mist into the space (2, 2') in the engine.

23. A method as claimed in claim 2, wherein aqueous liquid is fed into the spray head (3, 3') and heated by heat in the engine exhaust gasses prior to feeding the mist into the space (2, 2') in the engine.

24. In a method for cleaning exhaust gases from a combustion engine, the improvements comprising feeding a mixture of gas end an amount of aqueous mist from a spray head (3, 3') into a space (2, 2') that leads to a combustion chamber of the combustion engine, wherein the mixture ratio of the gas and the aqueous mist is changed according to changes in load of the combustion engine,
wherein aqueous liquid and the gas are mixed into another mixture, which is supplied to the spray head (3) so as to obtain the mixture of gas and aqueous mist, and
wherein aqueous liquid is fed into the spray head (3, 3') and heated by means of the heat in the engine exhaust gasses prior to feeding the mist into the space (2, 2') in the engine.

25. In a method for cleaning exhaust gases from a combustion engine, the improvements comprising feeding a mixture of gas and an amount of aqueous mist from a spray head (3, 3') into a apace (2, 2') that leads to a combustion chamber of the combustion engine, wherein the mixture ratio of the gas and the aqueous mist is changed according to changes in load of the combustion engine,
wherein aqueous liquid and the gas are supplied to the spray head (3'), in which the gas and the liquid are mixed so as to obtain the mixture of gas and aqueous mist, and
wherein aqueous liquid is fed into the spray head (3, 3') and heated by means of the heat in the engine exhaust gasses prior to conducting the liquid into said space (2, 2') in the engine.

26. A method as claimed in claim 4, wherein the gas is air.

27. A method as claimed in claim 26, wherein the air is fed with a compressor (6, 6') and that the aqueous liquid is fed with a pump (11, 11') into the spray head (3, 3').

28. In a method for cleaning exhaust gases from a combustion engine, the improvements comprising feeding a mixture of gas and an amount of aqueous mist from a spray head (3, 3') into a space (2, 2') that leads to a combustion chamber of the combustion engine, wherein the mixture ratio of the gas and the aqueous mist is changed according to changes in load of the combustion engine, wherein aqueous liquid and the gas are supplied to the spray head (3'), in which the gas and the liquid are mixed so as to obtain the mixture of gas and aqueous mist, and wherein exhaust gases from the combustion engine, which are washed prior to feeding into the spray head (3, 3') are used as the gas.

29. In a method for cleaning exhaust gases from a combustion engine, the improvements comprising feeding a mixture of gas and an amount of aqueous mist from a spray head (3, 3') into a space (2, 2') that leads to a combustion chamber of the combustion engine, wherein the mixture ratio of the gas and the aqueous mist is changed according to changes in load of the combustion engine, wherein aqueous liquid and the gas are supplied to the spray head (3'), in which the gas and the liquid are mixed so as to obtain the mixture of gas and aqueous mist, wherein the gas is air, wherein the air is fed with a compressor (6, 6') and that the aqueous liquid is fed with a pump (11, 11') into the spray head (3, 3'), and wherein the aqueous mist is sprayed into the exhaust gases for washing the exhaust gases.

30. A method as claimed in claim 29, wherein the aqueous mist is sprayed at a pressure of 10 to 300 bar.

31. An apparatus for feeding humid air into a combustion engine, the apparatus comprising a spray head (3, 3') for feeding aqueous mist into a space (2, 2') in the combustion engine, gas feeding means (6, 6') for feeding gas into the spray head (3, 3'), liquid feeding means (8, 8') for feeding aqueous liquid into the spray head, mixing means (P') for providing a mixture of gas and aqueous mist from the spray head into said space (2, 2'), which is arranged to be in flow connection with the combustion chamber of the combustion engine and to supply the mixture of gas and aqueous mist into the combustion chamber, control means (60) for controlling the feeding amount of the aqueous liquid from the feeding means (8, 8'), control means for controlling the feeding amount of the gas from the feeding means (6, 6') such that the mixture ratio of the gas and the aqueous mist to be fed can be changed according to changes in the engine load, and a high-pressure spray head (61) for spraying aqueous mist into the exhaust gases from the combustion engine so as to wash them, wherein the gas feeding means comprise means (70) for conducting the washed exhaust gases into the spray head (3, 3'), wherein the gas feeding means comprise a compressor (6, 6').

* * * * *